United States Patent
Wu

(10) Patent No.: US 6,725,544 B1
(45) Date of Patent: Apr. 27, 2004

(54) ANVIL STRUCTURE FOR GARDEN CLIPPERS

(75) Inventor: Shih-Piao Wu, Chang Hua Hsien (TW)

(73) Assignee: Jiin Haur Industrial Co., Ltd., Chang Hua Hsien (TW)

( * ) Notice: Subject to any disclaimer, the term of this patent is extended or adjusted under 35 U.S.C. 154(b) by 0 days.

(21) Appl. No.: 10/412,760

(22) Filed: Apr. 14, 2003

(51) Int. Cl.⁷ .................................................. B25F 1/00
(52) U.S. Cl. ............................. 30/144; 30/151; 30/146; 30/193; 30/254; 7/134; 7/158
(58) Field of Search .................... 30/131, 134, 144, 30/145, 146, 178, 186, 229, 230, 244, 254, 252, 175, 194, 191, 173, 151, 211, 142, 135, 234, 261, 225; 7/134, 129, 158

(56) References Cited

U.S. PATENT DOCUMENTS

| | | | | |
|---|---|---|---|---|
| 486,560 A | * | 11/1892 | Dinkel | 30/135 |
| 569,284 A | * | 10/1896 | Jacks | 30/135 |
| 683,457 A | * | 10/1901 | Flowers | 30/131 |
| 887,494 A | * | 5/1908 | Mulertz | 30/135 |
| 3,520,058 A | * | 7/1970 | Pfaffenbach | 30/134 |
| 5,544,416 A | * | 8/1996 | Lin | 30/193 |
| 5,546,661 A | * | 8/1996 | Yang | 30/146 |

\* cited by examiner

*Primary Examiner*—Boyer D. Ashley
(74) *Attorney, Agent, or Firm*—Harrison & Egbert

(57) ABSTRACT

This creation is to provide a kind of anvil structure improvement for garden clippers. Such anvil is installed at the end of garden clippers' first handle, allowing the moving blade at the end of the second handle to oscillate into contact against the inner anvil surface of that anvil. The inner side of that anvil is a flat surface, the tip of which is in a position of jutting out from the tip of the moving blade. The anvil features a first cutting edge at the anvil's outer side, and a second cutting edge is further installed at the tip of the anvil. The provision of such first, second cutting edge adds extra functions of cutting, digging and drilling to the garden clippers as their primary applications.

5 Claims, 7 Drawing Sheets

ANVIL STRUCTURE FOR GARDEN CLIPPERS

RELATED U.S. APPLICATIONS

Not applicable.

STATEMENT REGARDING FEDERALLY SPONSORED RESEARCH OR DEVELOPMENT

Not applicable.

REFERENCE TO MICROFICHE APPENDIX

Not applicable.

FIELD OF THE INVENTION

This creation is in connection with a kind of structure for garden clippers, especially one new garden clippers structure type whose anvil portion is provided with a first cutting edge and a second cutting edge.

BACKGROUND OF THE INVENTION

Garden clippers are a sort of hand-held tool used in gardening for cutting and trimming branches and leaves. The customary structure is well known by the public. They are used mainly by squeezing the two handles to bring the moving blade to cut against the anvil and thus, accomplish the task of cutting branches and leaves; and that is all the various garden clippers available on the market can do, no more. However, when faced with fierce competition in the market, if a company continues to push out new products by confining itself into the boundary of single-function types, obviously, it would be a uphill campaign for this company in efforts trying to overpass the competitors and hence win over the consumers.

With this in mind, targeting at the shortcomings of the limited functions and lacking of new ideas with the customary garden clippers, how to develop a new type of garden clippers structure with multiple functions and avant-garde design is apparently a challenge for the companies in this business.

BRIEF SUMMARY OF THE INVENTION

Facts of the enhanced effects of this creation are as follows.

To provide a new type of garden clippers structure, of which, the anvil is added with a first cutting edge and a second cutting edge.

Through the additional first cutting edge, an extra function of cutting will be added to the garden clippers (as illustrated in FIG. 6).

The provision of the second cutting edge will allow the garden clippers to have added-on functions of digging and drilling (as shown in FIG. 7).

DETAILED DESCRIPTION OF THE INVENTION

Figure 1:
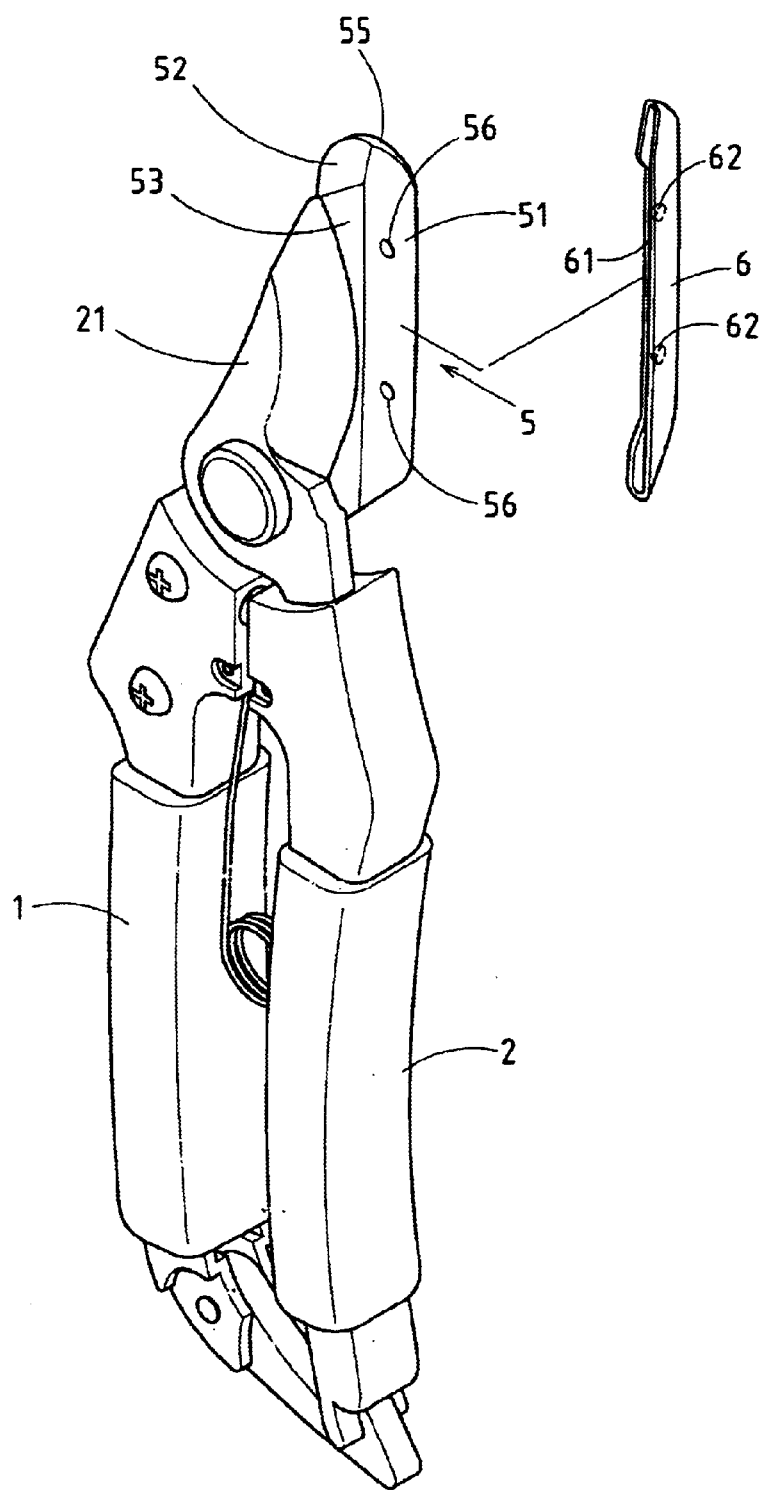
FIG. 1 three-dimensional schematic of this creation.
Figure 2:
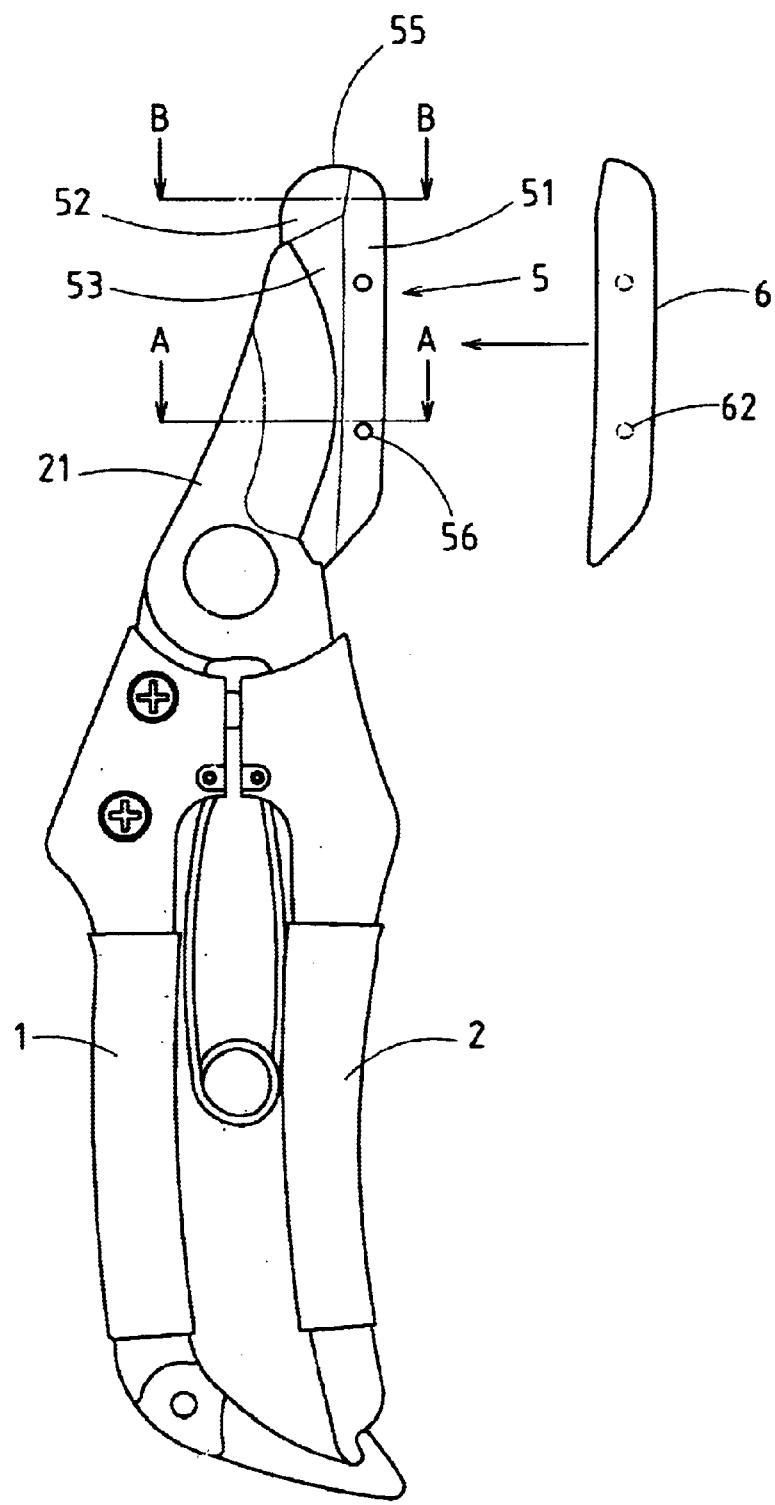
FIG. 2 plan view of this creation.
Figure 3:
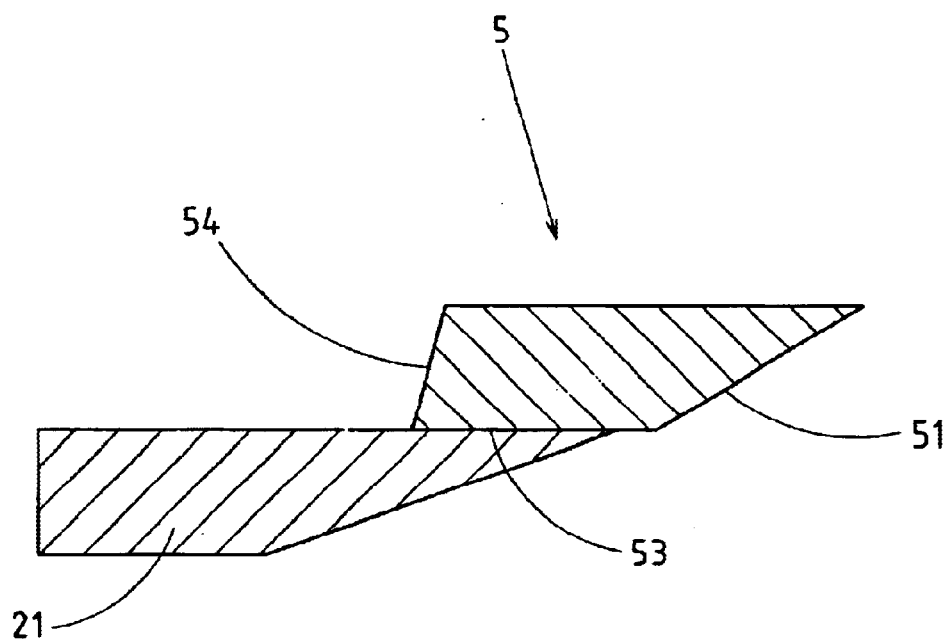
FIG. 3 A—A section view of FIG. 2.

For better knowledge and understanding of the purposes, features and functions for your respectable review panel members, detailed descriptions (together with Simple Descriptions of the Figures) are hereby given in following.

Figure 4:
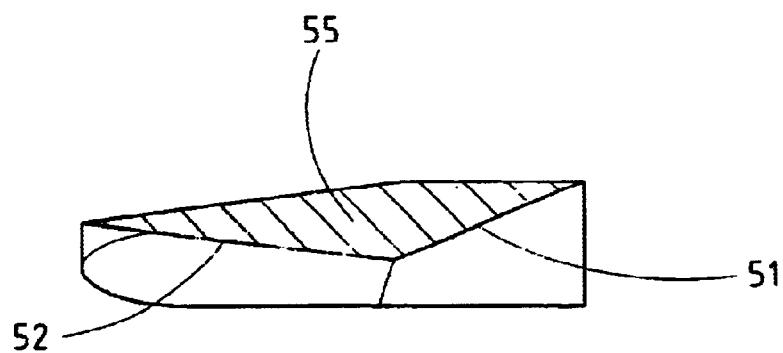
FIG. 4 B—B section view of FIG. 2.
Figure 5:
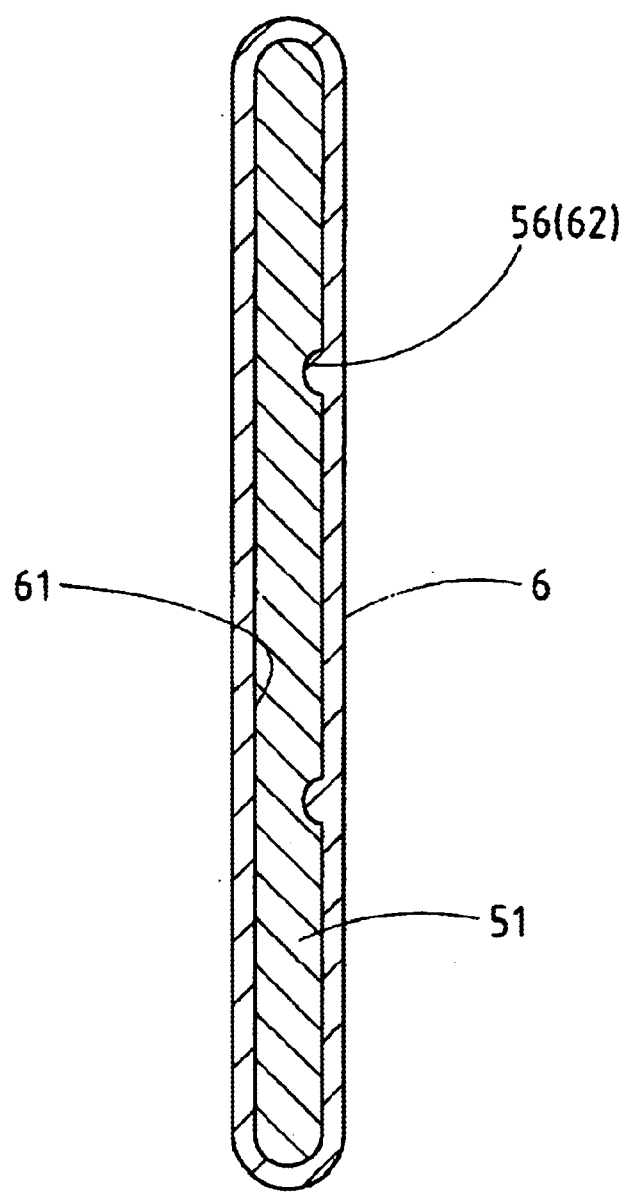
FIG. 5 section view of the first cutting edge with cover installed.
Figure 6:
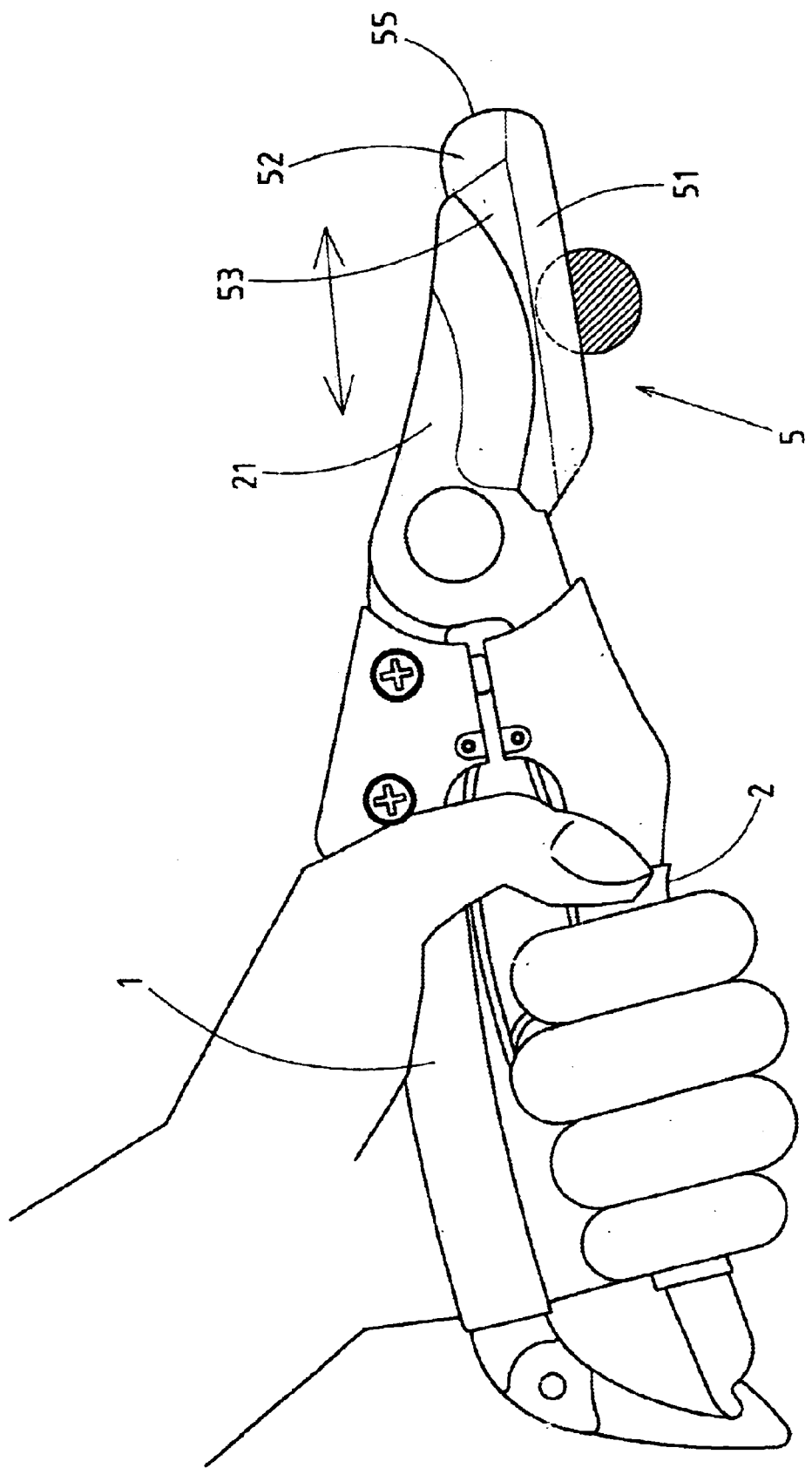
FIG. 6 first application illustration of this creation.
Figure 7:
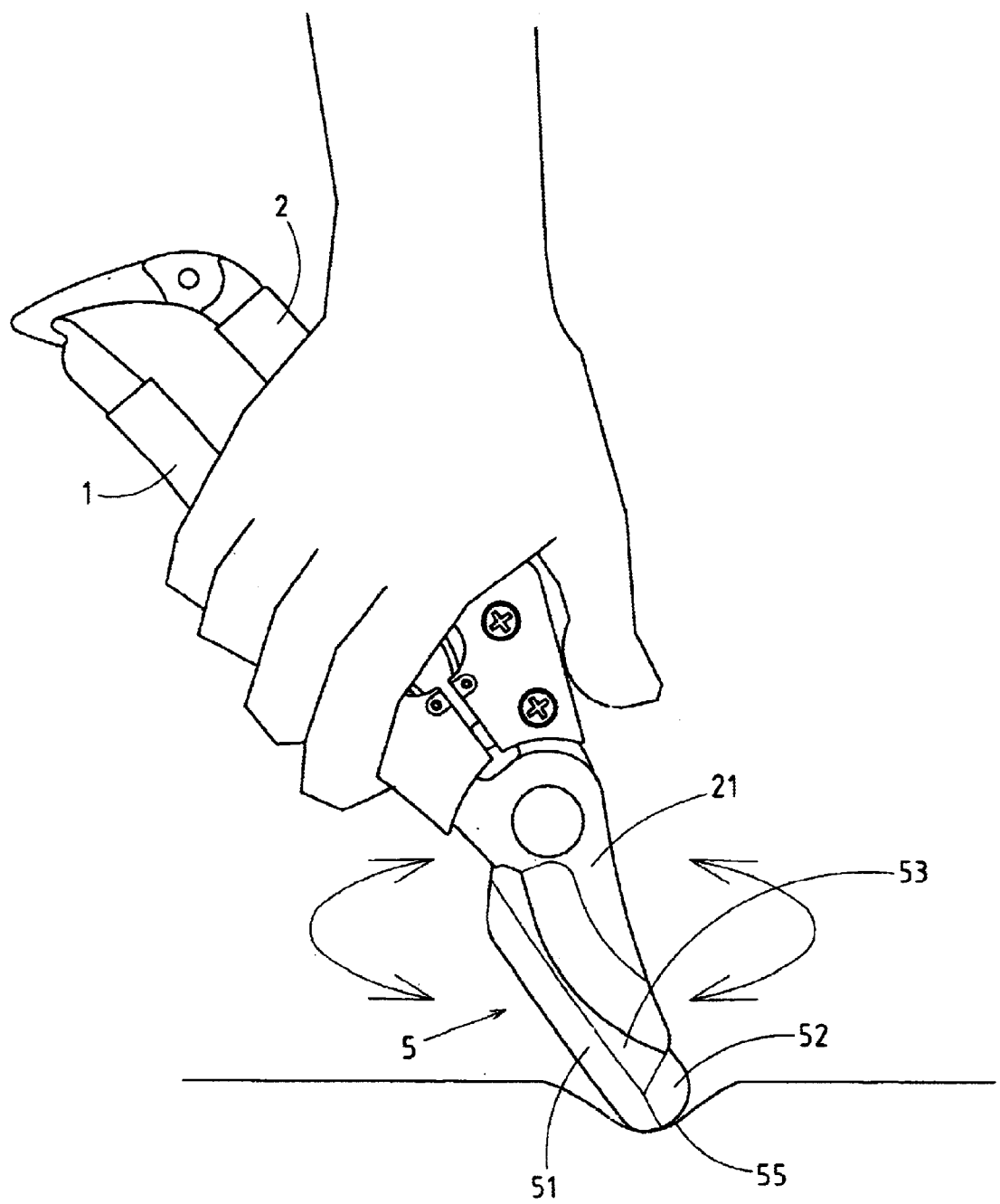
FIG. 7 second application illustration of this creation.
Figure 8:
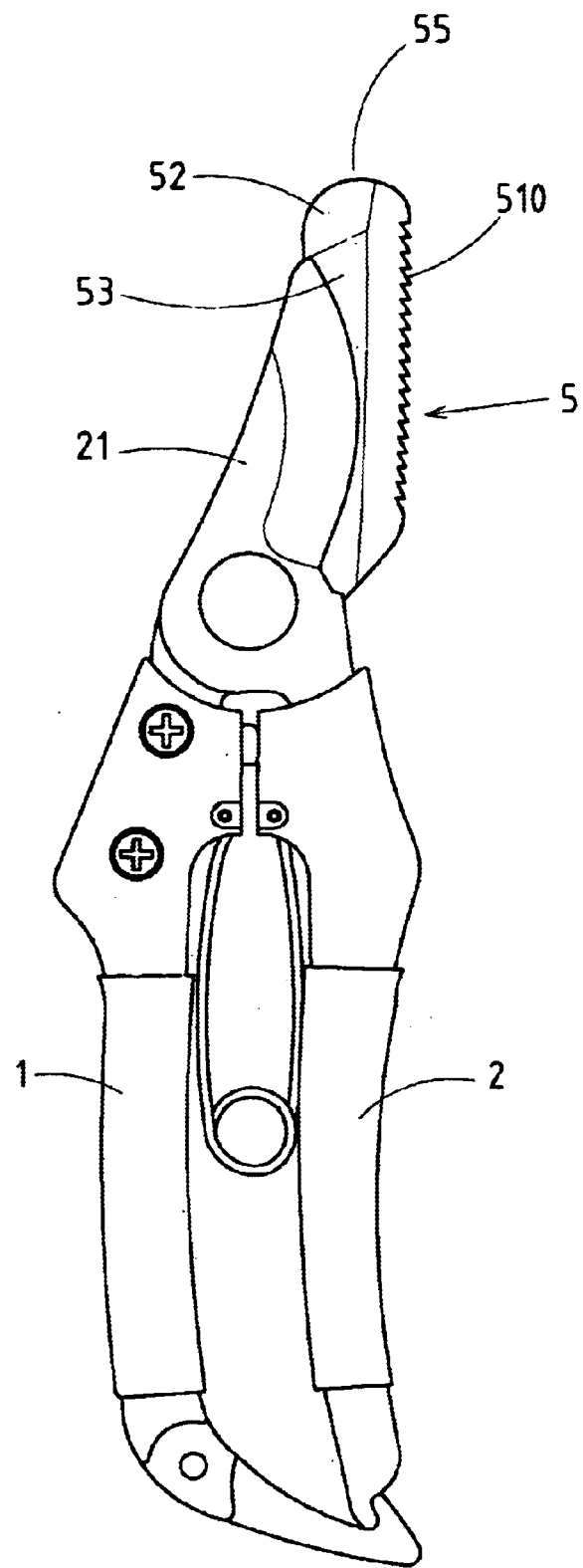
FIG. 8 application illustration of another structure variation of this creation.

First of all, please refer to illustrations in FIGS. 1, 2, 3 and 4, which show the better application of the improved anvil structure for garden clippers in this creation. That anvil 5 is installed at the end of garden clippers' first handle 1, allowing the moving blade 21 at the end of the second handle 2 to oscillate into contact against the inner anvil surface 53 of the anvil 5. The inner side of that anvil 5 is a flat surface, the tip 55 of which is in a position of jutting out from the tip of the moving blade 21. The features of the improvement are:

- the outer side of the anvil 5 is provided with a first cutting edge 51, and a second cutting edge 52 is further installed at the tip 55 of the anvil 5,
- of which, the tip 55 of the anvil 5 can be machined into round edge shape,
- of which, the surface cut angle of the second cutting edge 52 can be designed to come into symmetry with the first cutting edge 51 (as shown in FIG. 4);
- of which, a cover 6 can be provided for concealing the first cutting edge 51 when it is not in use. The cover 6 is installed with a slot 61 to slip onto the first cutting edge 51, moreover, semi-spherical projections 62 can be provided on the inside wall of the slot 61, and positioning holes provided on the corresponding positions on the first cutting edge 51, so that the cover 6 can be snapped into position when slipping onto the cutting edge (please refer to illustrations in FIGS. 1 and 5);
- of which, the first cutting edge portion 510 can also be machined into saw-toothed edge (as shown in FIG. 8).

I claim:

1. A anvil structure for garden clippers comprising:

first handle;

an anvil affixed to an end of said first handle, said anvil having an inner surface and an outer surface;

a second handle;

a moving blade affixed to an end of said second handle, said second handle being movable with respect to said first handle such that said moving blade comes into contact with said inner surface of said anvil, said anvil having an inner side that is a flat surface, said inner side having a tip jutting out from a tip of said moving blade, an outer surface of said anvil having a first cutting edge and a second cutting edge, said second cutting edge being at a tip of said anvil.

2. The anvil structure of claim 1, said tip of said anvil being machined into a round edge.

3. The anvil structure of claim 1, said second cutting edge having a surface cut angle symmetrical with said first cutting edge.

4. The anvil structure of claim 1, further comprising:
a cover removably snap-fitted over said first cutting edge, said cover having a slot suitable for slipping onto said first cutting edge, said slot having semi-spherical projections on an inside wall of said slot, said first cutting edge having positioning holes corresponding in position to said semi-spherical projections of said slot.

5. The anvil structure of claim 1, said first cutting edge machined into a saw-toothed edge.

* * * * *